1,635,732

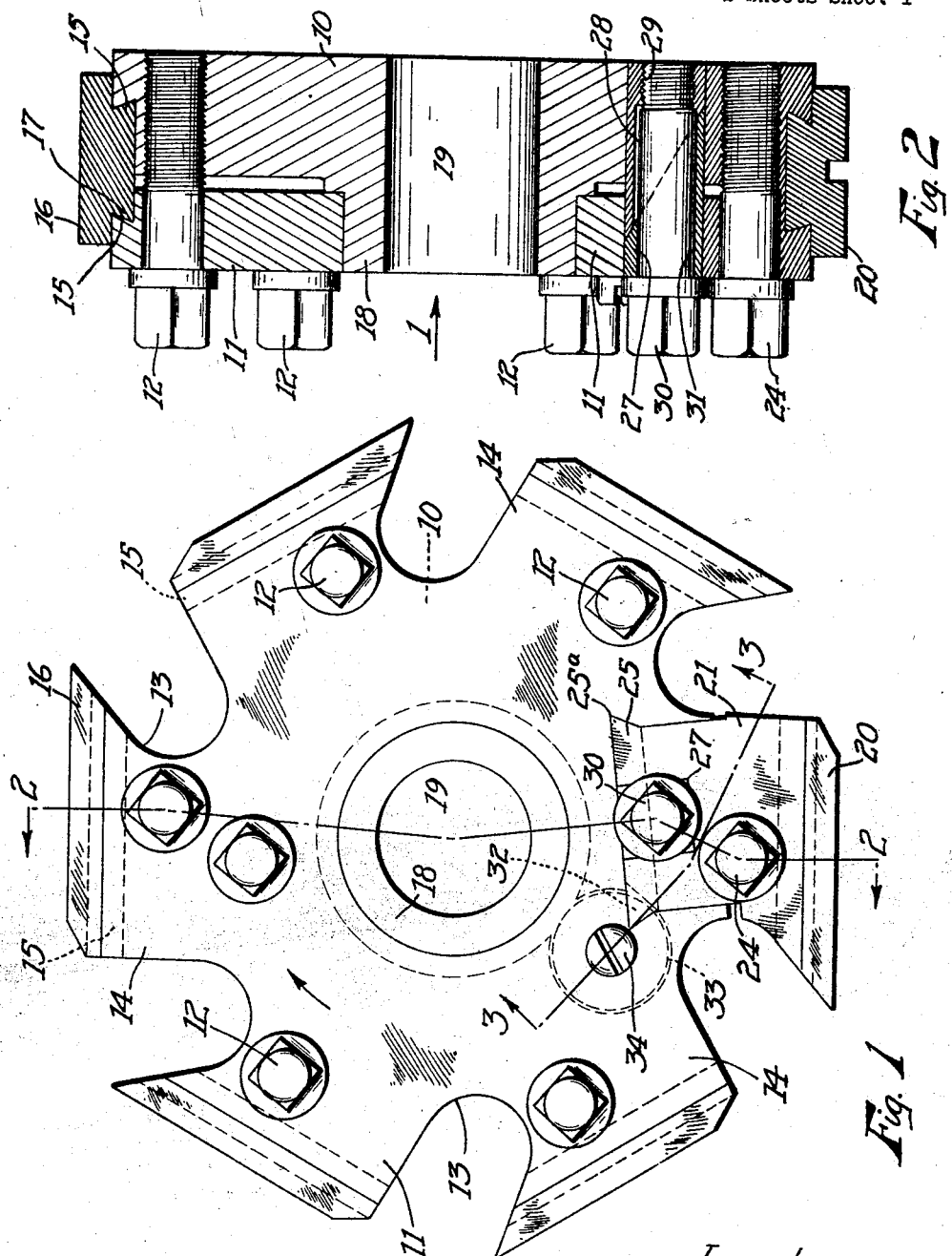
July 12, 1927.
J. J. WITT
MOLDING CUTTER
Filed Feb. 24, 1925
1,635,732
2 Sheets-Sheet 1
Inventor
John J. Witt
By Attorneys July 12, 1927.
J. J. WITT
1,635,732
MOLDING CUTTER
Filed Feb. 24, 1925
2 Sheets-Sheet 2
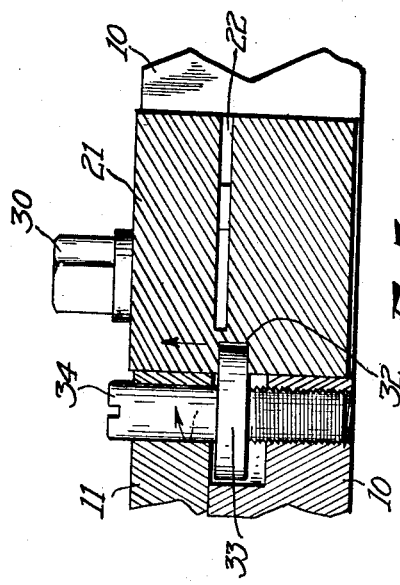
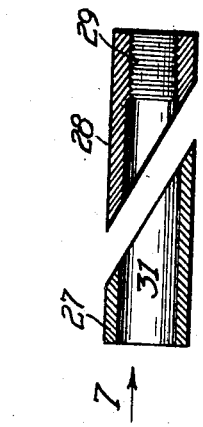
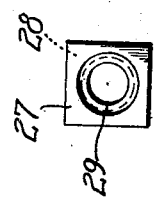
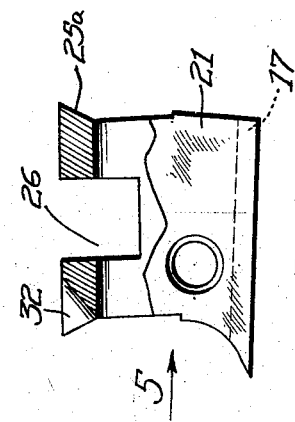
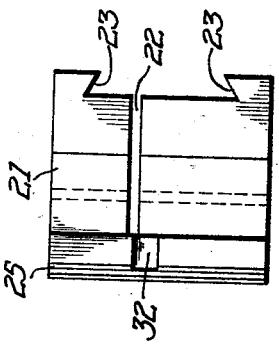
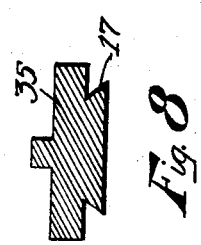
Inventor
John J. Witt
By Attorneys Patented July 12, 1927.

UNITED STATES PATENT OFFICE.

JOHN J. WITT, OF WINCHENDON, MASSACHUSETTS, ASSIGNOR TO GOODSPEED MACHINE COMPANY, OF WINCHENDON, MASSACHUSETTS, A CORPORATION OF MASSACHUSETTS.

MOLDING CUTTER.

Application filed February 24, 1925. Serial No. 11,034.

This invention relates to a molding cutter such as is used in machines for making wood flooring and other similar products. In such operations as the making of tongues and grooves on the edges of wood flooring, it is necessary that the width of the tongues and grooves shall be accurately adjusted to fit closely together.

It has been found a matter of considerable difficulty to keep the cutters in such shape that the tongues and grooves will exactly coincide. If the cutters become dull, the tongues will be thickened and the grooves will be narrowed, resulting in too close a fit. It is also found that the condition of the wood, whether hard or soft, moist or dry, also changes the width of the tongue or groove which a given cutter will produce.

It is the object of my present invention to provide means by which a molding cutter may be easily and quickly adjusted to bring the width of the tongue or groove to an exact desired dimension.

In the accomplishment of this object I provide means for adjusting one or more of the molding cutters axially of the cutter head so that these cutters may be positioned slightly out of alignment with the other cutters to increase the width of the groove or to decrease the width of the tongue produced thereby.

I have also provided novel and effective means for securing the cutter in its adjusted position and for holding it firmly from displacement.

My invention further relates to arrangements and combinations of parts which will be hereinafter described and more particularly pointed out in the appended claims.

A preferred form of the invention is shown in the drawings in which

Fig. 1 is a side elevation of my improved molding cutter;

Fig. 2 is a sectional transverse elevation, taken along the irregular line 2—2 in Fig. 1;

Fig. 3 is a detail sectional view, taken along the line 3—3 in Fig. 1;

Fig. 4 is a side elevation, partly in section, of the cutter slide;

Fig. 5 is an end elevation of the cutter slide, looking in the direction of the arrow 5 in Fig. 4;

Fig. 6 is a sectional view of the clamping sleeve for holding the slide in position;

Fig. 7 is an end view of the sleeve, looking in the direction of the arrow 7 in Fig. 6; and Fig. 8 is a transverse sectional view of a grooving cutter.

Referring particularly to Figs. 1 and 2, I have shown my improved molding cutter as comprising a head 10 having a clamping ring 11 secured to one face thereof by a plurality of bolts 12. The outer portions of the head 10 and ring 11 are cut away to provide recesses 13 between cutter-supporting portions 14.

Guide-ways 15 are provided in the head and in the ring in each cutter-supporting portion 14, and the cutters 16 are provided with corresponding guiding projections 17. The cutters 16 may be adjusted along the guide-ways 15 in a substantially tangential direction and may be firmly clamped in adjusted position by the bolts 12. The ring 11 is preferably centered upon a projecting hub portion 18 of the head 10 which is also provided with an axial opening 19 to receive a driving spindle.

My invention relates particularly to the means provided for adjusting one or more of the cutters 20 axially of the cutter head. For this purpose I provide for each such cutter a slide 21 (Fig. 5) having a slot 22 therein. This slot permits the two portions of the slide to be drawn tightly together to clamp a cutter 20 between guide-ways 23 formed on said slide. A bolt 24 is provided for thus drawing the parts of the slide together to grip and hold the cutter, as indicated in Fig. 2.

The slide 21 is also provided with a dovetailed extension 25 fitting a guide-way 25ª extending through the head 10 and ring 11. A rectangular recess 26 is formed in the slide and is adapted to receive a rectangular clamping sleeve formed in two portions 27 and 28 (Fig. 6).

These sleeve portions are bevelled at their adjacent ends, as indicated in Fig. 6, and the portion 28 is threaded at 29 to receive a clamping bolt 30 which extends freely through a recess 31 in the sleeve portion 27. When the bolt 30 is tightened, the sleeve portions 27 and 28 are drawn towards each other. The opening 31 is of sufficient diameter to permit the sleeve portions to be moved slightly out of alignment with each other when forced together. Such movement presses the two parts of the slide extension 25 outward in its guide-way 25ª, thus clamping the slide firmly therein and preventing further axial movement thereof.

A notch or recess 32 (Fig. 3) is formed in a portion of the slide 21 and receives a flange 33 on an adjusting screw 34 threaded into the head 10. When the clamping bolt 30 is loosened, the slide may be adjusted axially by turning the screw 34. When the slide is in its desired position, it may be held from displacement by tightening the bolt 30 in the clamping sleeve.

The cutter 20 shown in Fig. 2 is of the type used for cutting the tongues and the cutter 35 shown in Fig. 8 is of the type used for cutting the grooves.

Having described the construction and operation of my improved molding cutter, the advantages thereof will be readily apparent. If for any reason it is desirable to decrease the width of the tongue or increase the width of the groove, the slide 21 may be adjusted axially to throw one of the cutters out of alignment with the other cutters in the set. Quick and accurate adjustment of the cutters is thus provided for and it is a very simple matter to so adjust the cutters that the tongues and grooves will fit accurately together.

Having thus described my invention and the advantages thereof, I do not wish to be limited to the details herein disclosed otherwise than as set forth in the claims, but what I claim is:—

1. A molding cutter comprising a head, a plurality of cutters mounted thereon, and means to adjust one of said cutters axially of said head, said means comprising a guideway in the head, a slide movable in said guideway, means to clamp a cutter in said slide, and means adjacent said guideway and coacting with the head, to secure said slide in adjusted axial position in said head.

2. A molding cutter comprising a head, a plurality of cutters mounted thereon, and means to adjust one of said cutters axially of said head, said means comprising a slide, means to secure said cutter in said slide, a clamping sleeve formed in two parts having their adjacent ends oppositely bevelled, and means to draw said sleeve parts together to bind said slide in said head.

3. A molding cutter comprising a head, a plurality of cutters mounted thereon, and means to adjust one of said cutters axially of said head, said means comprising a slide axially movable in a guide-way in said head and having a recess therein, a clamping sleeve fitting in said recess and formed in oppositely bevelled parts, and means to draw said sleeve parts together against the walls of said recess and thereby force opposite portions of said slide against the sides of said guide-way to secure said slide in said head.

4. A molding cutter comprising a head, a plurality of cutters mounted for tangential adjustment in said head, and means to adjust one of said cutters axially, said means comprising a channel in the head, a slide movable in said channel, means to clamp a cutter in said slide and to permit tangential adjustment thereof, means to adjust said slide axially of said head, and means coacting with the head to clamp said slide in said guide.

5. A molding cutter comprising a head, a plurality of cutters mounted for tangential adjustment in said head, and means independent of the remaining cutters, to adjust one of said cutters axially, said means comprising a channel through said head, a slide guided therein, means to clamp a cutter in said slide, said slide having a notch therein, an adjusting screw threaded in said head and having a flange fitting said notch, and means to positively clamp said slide in axially adjusted position in said head.

In testimony whereof I have hereunto affixed my signature.

JOHN J. WITT.